(12) United States Patent
Viol (10) Patent No.: US 7,264,425 B1
(45) Date of Patent: Sep. 4, 2007

(54) TOOL

(75) Inventor: Kent Viol, Arbogo (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/671,245

(22) Filed: Feb. 5, 2007

(30) Foreign Application Priority Data

Feb. 15, 2006 (SE) .................................. 0600338

(51) Int. Cl.
*B23B 27/22* (2006.01)
*B23C 5/00* (2006.01)

(52) U.S. Cl. ...................................... 407/113; 407/114

(58) Field of Classification Search ................ 407/113, 407/114, 115, 116, 119, 66, 67
See application file for complete search history.

(56) References Cited

U.S. PATENT DOCUMENTS

| | | | |
|---|---|---|---|
| 4,776,733 A | 10/1988 | Pettersson | |
| 5,647,263 A * | 7/1997 | Wildey | 83/835 |
| 6,604,893 B2 * | 8/2003 | Nelson | 407/35 |
| 6,733,212 B2 * | 5/2004 | Nagaya et al. | 407/34 |
| 6,733,214 B2 * | 5/2004 | Scherbarth | 407/113 |

FOREIGN PATENT DOCUMENTS

EP        0241973 A2    3/1987

* cited by examiner

*Primary Examiner*—Willmon Fridie, Jr.
(74) *Attorney, Agent, or Firm*—WRB-IP LLP (57) ABSTRACT

The present invention relates to cutting tools with cutting inserts and, more particularly, to cutting inserts having adjusted cutting edges. The cutting insert comprises a virtual clearance surface that is one of substantially flat and planar and substantially frustoconical. The virtual clearance surface forms a non-zero angle with a perpendicular to a virtual plane of a top surface of the insert. A first virtual cutting edge is disposed above the virtual clearance surface. All points on the first virtual cutting edge are disposed at the plane of the top surface. An adjusted clearance surface differs from the virtual clearance surface and forms the non-zero angle with the perpendicular to the plane of the top surface. An adjusted cutting edge above the adjusted clearance surface, at least some but fewer than all points on the adjusted cutting edge are disposed at different distances from the plane of the top surface. A profile of the adjusted cutting edge viewed in the direction of the perpendicular to the plane of the top surface corresponds to a profile of the first virtual cutting edge. The present invention also relates to a cutting tool.

15 Claims, 6 Drawing Sheets

TOOL

BACKGROUND AND SUMMARY

The present invention relates to cutting tools with cutting inserts and, more particularly, to cutting inserts having adjusted cutting edges.

Tools for machining operations such as milling, turning, boring, parting, grooving, threading, and drilling often include toolholders for holding one or more replaceable cutting inserts. The cutting inserts are typically made of a much harder material, such as cemented carbide, than the tool holder. The cutting inserts can be secured to the tool holder in any suitable manner, such as by brazing or, more typically today, clamping by means of a screw or a clamping arrangement.

Many cutting inserts have partially or completely elliptical or circular profiles and are used to cut a generally semi-circular or elliptical grooves in a workpiece. Other inserts have generally straight profiles and are designed to cut generally V-shaped, square, or rectangular grooves in a workpiece. For various reasons, such as to present a sharper cutting edge to a workpiece, inserts are often designed with a wedge angle at the cutting edges between the top and the side surfaces that is less than 90°. Also, the insert may be tilted so that a plane of the top surface is non-perpendicular to the workpiece, such as to present a cutting edge with a narrow wedge angle at a desired angle to the workpiece. Below the cutting edge, so that the side surface does not contact the workpiece after the cutting edge cuts into the workpiece, the side surface extends at a non-zero clearance angle to a plane of the top surface. Thus, an insert that has a generally circular profile when viewed along a perpendicular to a plane of the top surface may be generally frustoconical and have a smaller bottom surface than the top surface. An insert that is polygonal, such as triangular, square, rectangular, rhombic, etc, may also be smaller at the bottom surface than the top surface in order to provide a clearance angle.

It is also common for cutting edges to be designed to vary relative to a virtual plane of the top surface of the insert, e.g., the cutting edges may curve. This may be done to facilitate chip formation or removal, or for other reasons. While the curvature of the cutting edge may be desirable with respect to certain aspects of the machining operation, because of the non-zero clearance angle, the curve of the cutting edge alters the shape of the profile of the insert when viewed along a perpendicular to the plane of the top surface. This can result in a machined shape that is not desired. For example, it may not be possible to form a corner that has a desired radius or that is sufficiently square, or it may cause undesired ridges and grooves to be formed in a workpiece.

As seen in FIGS. 6A-6C and 7A-7C, showing generally circular inserts C25 and square edged inserts S25 for purposes of illustration, because the clearance surfaces C45 and S45 below the cutting edges C47 and S47 form a non-zero angle α with a perpendicular to the top plane CP and SP of the inserts, as the cutting edges move downward in the direction of the perpendicular to the top plane, the cutting edges recede from outermost points where the cutting edges are axially highest with respect to the perpendicular to the top plane. For example, as described in connection with the circular insert C25, the cutting edge C47 recedes from an outermost diameter DO where the cutting edge is highest to an innermost diameter DI where the cutting edge is lowest. The location of the cutting edge at DI differs from the location of the cutting edge at DO by a distance Δ. The diameter db of the bottom of the insert remains constant. The profiles of the cutting edges C47 and S47 when viewed in the direction of the perpendicular to the plane are not circular or square, which may be problematic. It is desirable to provide a cutting tool and an insert that can avoid such problems.

In accordance with an aspect of the present invention, a cutting insert comprises a virtual clearance surface that is one of substantially flat and planar and substantially frustoconical, the virtual clearance surface forming a non-zero angle with a perpendicular to a virtual plane of a top surface of the insert and a first virtual cutting edge disposed above the virtual clearance surface, all points on the first virtual cutting edge being disposed at the plane of the top surface. The cutting insert also comprises an adjusted clearance surface differing from the virtual clearance surface and forming the non-zero angle with the perpendicular to the plane of the top surface, and an adjusted cutting edge above the adjusted clearance surface, at least some but fewer than all points on the adjusted cutting edge being disposed at different distances from the plane of the top surface, a profile of the adjusted cutting edge viewed in the direction of the perpendicular to the plane of the top surface corresponding to a profile of the first virtual cutting edge.

In accordance with another aspect of the present invention, a cutting tool comprises a cutting insert comprising a virtual clearance surface that is one of substantially flat and planar and substantially frustoconical, the virtual clearance surface forming a non-zero angle with a perpendicular to a virtual plane of a top surface of the insert, a first virtual cutting edge disposed above the virtual clearance surface, all points on the first virtual cutting edge being disposed at the plane of the top surface. The cutting insert also comprises an adjusted clearance surface differing from the virtual clearance surface and forming the non-zero angle with the perpendicular to the plane of the top surface, and an adjusted cutting edge above the adjusted clearance surface, at least some but fewer than all points on the adjusted cutting edge being disposed at different distances from the plane of the top surface, a profile of the adjusted cutting edge viewed in the direction of the perpendicular to the plane of the top surface corresponding to a profile of the first virtual cutting edge. The cutting tool also comprises a tool holder comprising a recess for receiving the insert and at least one abutment surface for abutting at least one side insert supporting surface on the insert.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
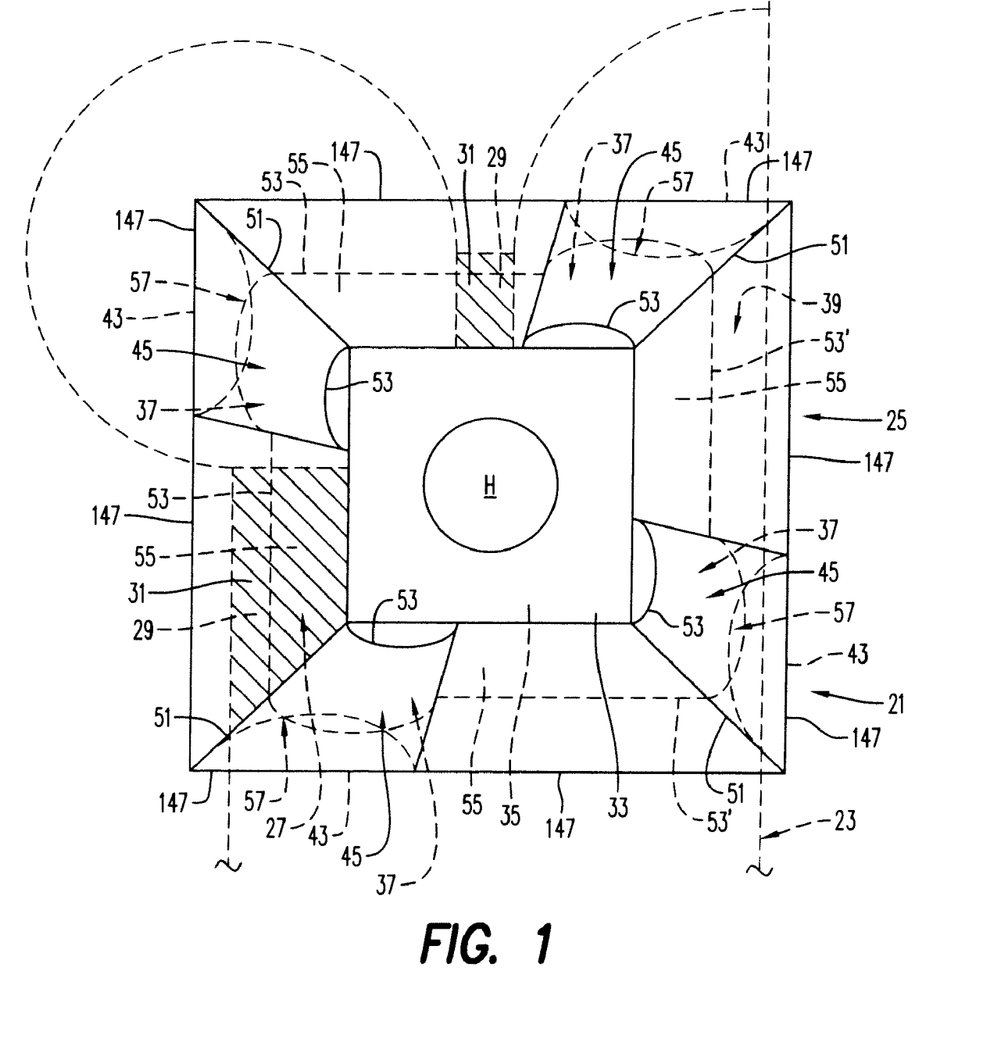
FIG. 1 is a bottom view of a cutting insert in a tool holder according to an embodiment of the present invention.

A cutting tool 21 including a tool holder 23 and a cutting insert 25 is shown in FIG. 1. The tool can be used for one or more machining operations, such as milling, turning, boring, parting, grooving, threading, and drilling. The tool holder 23 comprises a recess 27 for receiving the insert 25 and at least one side abutment surface 29 for abutting at least one side insert supporting surface 31 (shown as cross-hatched) on the insert. The insert 25 can be secured in the recess 27 in any conventional manner, such as by a screw (not shown) that extends through a hole H in the insert and mates with a threaded hole (not shown) in the tool holder, such as is described in, for example, U.S. Pat. No. 6,764, 257, which is incorporated by reference, or by a clamping arm that is integral with the tool holder, such as is described in, for example, U.S. Pat. No. 6,168,357, which is incorporated by reference, or by a clamping arm that is attached to the tool holder, such as is described in, for example, U.S. Pat. No. 6,702,528, which is incorporated by reference. A bottom supporting surface 33 of the insert 25 and a corresponding bottom abutment surface 35 of the tool holder 23 can be provided with patterns of, e.g., grooves and ridges (not shown), such as is described in, for example, U.S. Pat. No. 6,146,060, which is incorporated by reference, to facilitate coupling of the insert and the tool holder in one or more orientations relative to each other. The insert 25 can be indexable relative to the tool holder 23. It will be appreciated that the shapes of the inserts illustrated in the present application are exaggerated with respect to the shapes of typical inserts in order to illustrate features of the invention.

Figure 2A:
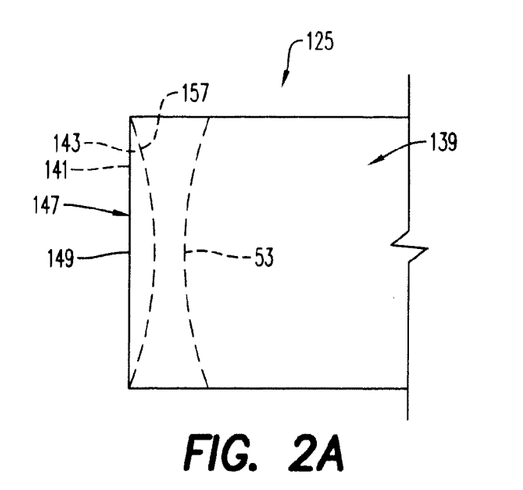
FIGS. 2A-2C are top, first side, and second side views of a cutting insert according to an embodiment of the present invention.
Figure 2B:
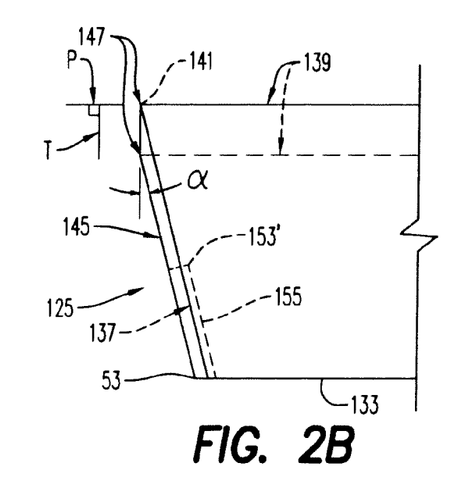
Figure 2C:
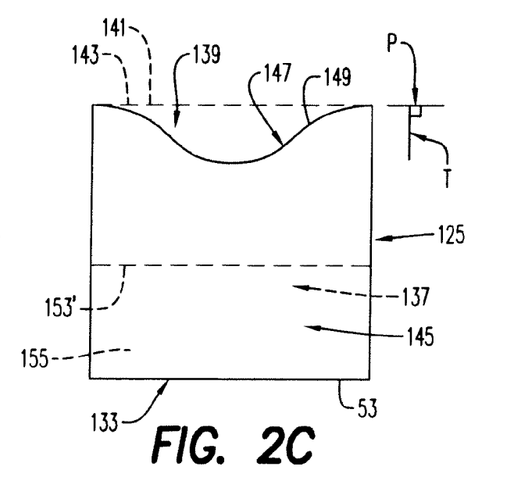

As seen in connection with the insert 125 in FIGS. 2A-2C, the insert includes a virtual clearance surface 137 that is substantially flat and planar. As seen in connection with the insert 225 in FIGS. 3A-3C, however, the insert can include a virtual clearance surface 237 that is substantially frustoconical. The insert can also include some combination of substantially flat and planar clearance surface(s) and substantially frustoconical clearance surface(s) (not shown). The reference to "substantially flat and planar" is not intended to exclude clearance surfaces in which recesses are provided or on which protrusions are provided, or clearance surfaces that have a curvature, such as is the case with so-called "helical" surfaces. The reference to "substantially frustoconical" is intended to cover shapes other than those that are circular in cross-section, such as shapes that are elliptical in cross-section, and is not intended to exclude clearance surfaces in which recesses are provided or on which protrusions are provided, or clearance surfaces that have a curvature. Also, the references to substantially flat and planar and substantially frustoconical are intended to include surfaces that only have portions that are flat and planar or frustoconical. Such inserts are intended to be encompassed in the definition of "substantially flat and planar" or "substantially frustoconical".

In the insert 125 and the insert 225, the virtual clearance surface 137 and 237, respectively, forms a non-zero angle α with a perpendicular T to a virtual plane P of a top surface 139 and 239, respectively, of the insert. The plane P of the top surfaces 139 and 239 can be at any desired location. Typically, the plane P will be perpendicular to some axis of the insert, such as an axis through a center hole of an insert having a center hole, and an uppermost point on the top surface will lie in the plane. However, the plane may be disposed above or below the uppermost point on the top surface. Additionally, while the invention is described here in terms of embodiments wherein the plane P is the plane of the top surface, it will be appreciated that the plane P could equally be the plane of the bottom surface, such as in certain types of inserts that are indexable by being turned upside down.

A first virtual cutting edge 141 and 241 is disposed above the virtual clearance surfaces 137 and 237, respectively. The first virtual cutting edges 141 and 241 will ordinarily be considered to define the top edges 143 and 243 of the virtual clearance surfaces 137 and 237, however, this is not necessarily the case. All points on the first virtual cutting edges 141 and 241 are disposed at the plane P of the top surfaces 139 and 239.

Adjusted clearance surfaces 145 and 245 differing from the virtual clearance surfaces and also forming the non-zero angle α with the perpendicular T to the plane P of the top surfaces 139 and 239. Adjusted cutting edges 147 and 247 are disposed above the adjusted clearance surfaces 145 and 245, and may define the top edges 149 and 249 of the adjusted clearance surfaces, although this is not necessarily the case. At least some but fewer than all points on the adjusted cutting edges 147 and 247 are disposed at different distances from the plane P of the top surfaces 139 and 239. The shape of the adjusted clearance surfaces 145 and 245 is adjusted such that, in spite of the position of the points on the adjusted cutting edges 147 and 247 at a distance from the plane P of the top surfaces 139 and 239, a profile of the adjusted cutting edges viewed in the direction of the perpendicular T to the plane of the top surface corresponds to a profile of the first virtual cutting edges 141 and 241, respectively. While the profile of the adjusted cutting edges 147 and 247 may be aligned with, i.e., match the profile of the virtual cutting edges 141 and 241, respectively, the profiles may instead be of corresponding shapes, but differ such as by being disposed at different locations or by being of different dimensions. The adjusted clearance surfaces 145 and 245 are adjusted in the sense that material is added or removed from the virtual clearance surfaces 137 and 237 to obtain the adjusted clearance surfaces.

Figure 3A:
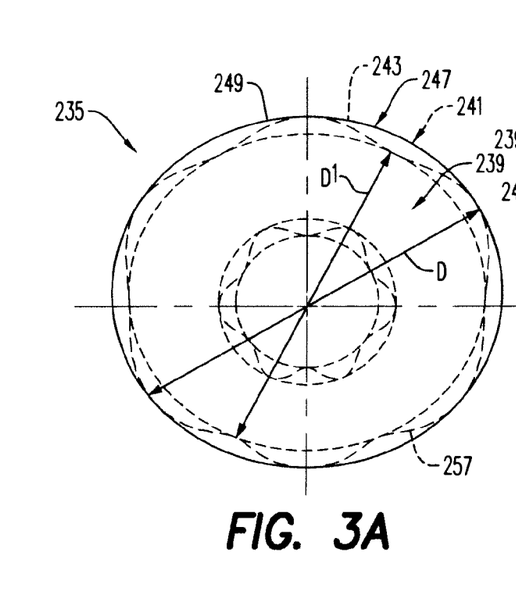
FIGS. 3A-3C are top, first side, and second side views of a cutting insert according to an embodiment of the present invention.
Figure 3B:
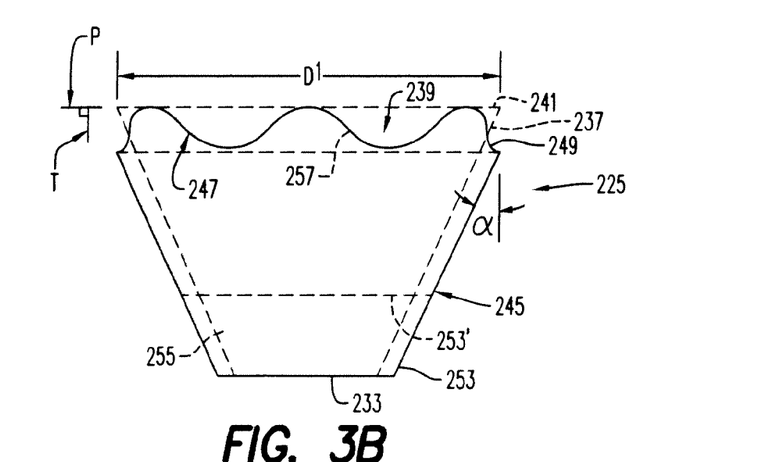
Figure 3C:
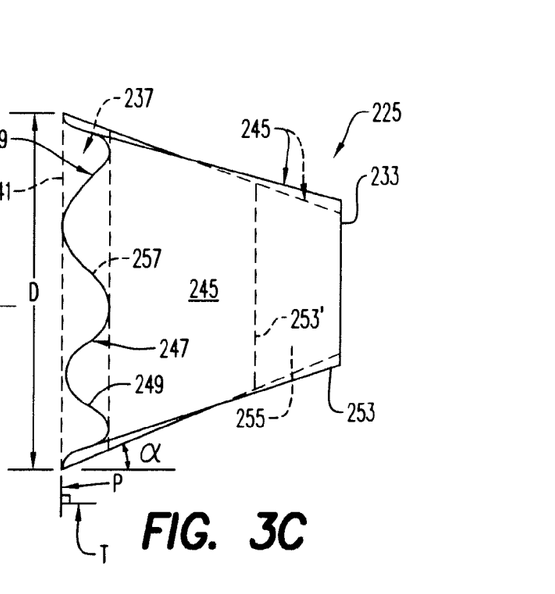

In the cutting insert 225 seen in FIGS. 3A-3C, adjusted clearance surface 245 extends at least partially around a periphery of the insert and, in this embodiment, extends around an entire periphery of the insert. In the cutting insert 225, the profile of the adjusted cutting edge 247 viewed in the direction of the perpendicular T to the plane P of the top surface 239 defines a substantially elliptical shape. In the illustrated embodiment of FIGS. 3A-3C, the profile of the adjusted cutting edge 247 viewed in the direction of the perpendicular T to the plane P of the top surface 239 at least partially defines a substantially circular shape, however, the substantially elliptical shape does not have to be a circle.

The insert may be a combination of shapes such that the adjusted clearance surface may be considered to extend only partially around the periphery of the insert. For example, in the insert 125 seen in FIGS. 2A-2C, the adjusted clearance surface 145 extends only partially around a periphery of the insert. In the insert 125, the profile of the adjusted cutting edge 147 viewed in the direction of the perpendicular T to the plane P of the top surface 139 defines a substantially straight line shape. In the insert 25 shown in FIG. 1, the adjusted clearance surface 45 extends only partially around a periphery of the insert and the profile of the adjusted cutting edge 47 viewed in the direction of the perpendicular to the plane of the top surface 39 defines a substantially straight line shape. In addition, in the insert 25 of FIG. 1, there are plural such adjusted clearance surfaces 45 and adjusted cutting edges 47 so that the insert defines a polygonal shape, such as a triangle, a rectangle, a square (as in FIG. 1), an octagon, etc. Clearance surfaces 51 between the adjusted clearance surfaces 45 may or may not be adjusted in the manner of the adjusted clearance surfaces. Different adjusted clearance surfaces on the same insert can be substantially flat and planar and can be substantially frustoconical.

As seen in FIGS. 1-3C, a bottom edge 53, 153, 253 of the adjusted clearance surface 45, 145, 245 can extend to a bottom surface 33, 133, 233 of the insert 25, 125, 225. However, as shown in phantom in FIGS. 2B-2C and 3B-3C, a bottom edge 153', 253' of the adjusted clearance surface 145, 245 can be disposed axially above the bottom surface 133, 233 of the insert 125, 225. If desired, the area 155, 255 between the bottom edge 153', 253' and the bottom surface 133, 233 can include a bottom insert supporting surface and may be formed to be, for example, flat to facilitate supporting the insert relative to a tool holder.

As seen in FIGS. 1, 2A, and 3A, a second virtual cutting edge 57, 157, 257 is disposed above the virtual clearance surface 37, 137, 237 and all points on the adjusted cutting edge 47, 147, 247 have corresponding points on the second virtual cutting edge and are disposed at equal distances from the plane P of the top surface as the points on the second virtual cutting edge such that a profile of the second virtual cutting edge viewed in a direction of the perpendicular to the plane of the top surface is different than a profile of the first virtual cutting edge 41, 141, 241. Because the second virtual cutting edge 57, 157, 257 will typically be shorter than the adjusted cutting edge 47, 147, 247, there is not necessarily a one-to-one correspondence of all points on the second virtual cutting edge and the adjusted cutting edge. A profile of a planar cross-section of the adjusted clearance surface 45, 145, 245 that is taken parallel to the plane P of the top surface, viewed in the direction of the perpendicular to the plane of the top surface inversely corresponds to a profile of the second virtual cutting edge 57, 157, 257 in the sense that the profiles are generally similar in shape and oriented at 180° to each other, although possibly differing in some respects, such as size.

How the curvature of a cutting edge affects the shape of the profile of an insert having a clearance surface that forms a non-zero angle with the perpendicular to the plane of the top surface is described in connection with the circular insert 225 shown in FIGS. 3A-3C. In the circular cutting insert 225, the diameter D of the virtual cutting edge 241 is the same as the diameter of the adjusted cutting edge 247. A diameter of the second virtual cutting edge 257 varies between the diameter D where the second virtual cutting edge is at the same height as the first virtual cutting edge 241 and another diameter $D^1$ where the second virtual cutting edge is lower than the first virtual cutting edge. By adjusting the virtual clearance surface 237 to form the adjusted clearance surface 245, the diameter of the profile adjusted cutting edge 247 viewed along the perpendicular T to the plane P of the top surface 239 can be changed to correspond with or coincide with the profile of the virtual cutting edge 241 as seen in FIG. 3A. However, if the adjusted clearance surface 245 is adjusted so that it forms a constant clearance angle with respect to the perpendicular T to the plane P of the top surface 239, the shape of the adjusted clearance surface viewed in the direction of the perpendicular T to the plane P of the top surface 239 will inversely correspond to the shape of the second virtual cutting edge 257.

As seen in FIGS. 1, 2B-2C, and 3B-3C, the side insert supporting surface(s) 31, 131, 231 can be disposed in the adjusted clearance surface 45, 145, 245, i.e., inside the boundaries of the adjusted clearance surface. Each adjusted clearance surface can include plural side insert supporting surfaces that can be used to support the insert in a single position or in multiple different indexed positions. The side insert supporting surfaces 31, 131, 231 can be entirely or partially inside the boundaries of the adjusted clearance surface. As seen in FIGS. 1, 2B-2C, and 3B-3C, the side insert supporting surface(s) 31, 131, 231 can also be disposed on the adjusted clearance surface 45, 145, 245, i.e., the clearance surface serves as the side insert supporting surface, i.e., at least part of or all of the side insert supporting surface forms part of the adjusted clearance surface.

Figure 4:
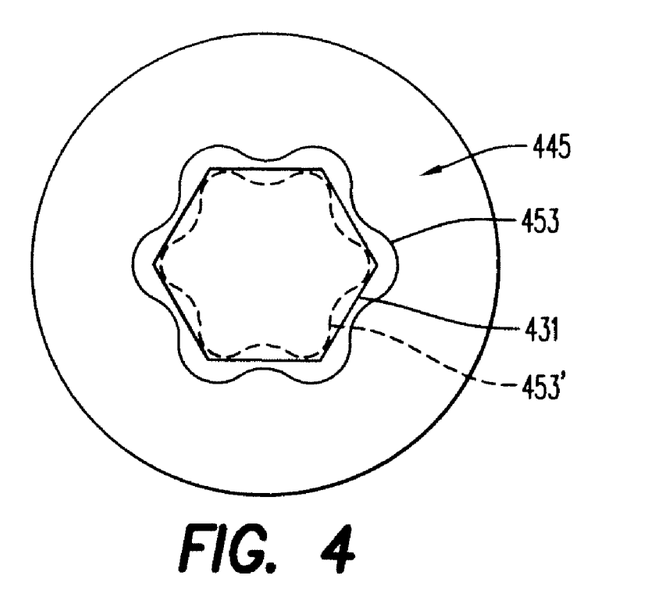
FIGS. 4 and 5 are bottom schematic views of cutting inserts according to embodiments of the present invention.

As seen in FIG. 4, which shows six side insert supporting surface(s) 431 below the bottom edge 453 of the adjusted clearance surface 445, the side insert supporting surfaces can be at least partially recessed with respect to the adjusted clearance surface. This is true, as well, if the side insert supporting surfaces are entirely or partially in the adjusted clearance surface.

Figure 5:
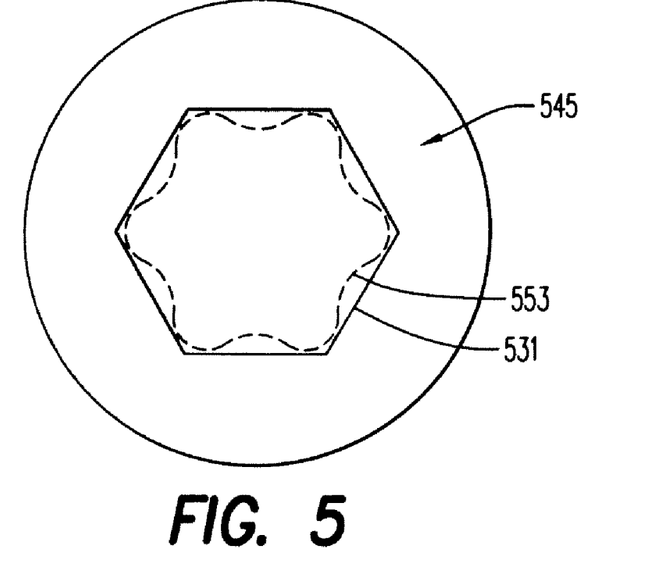
Figure 6A:
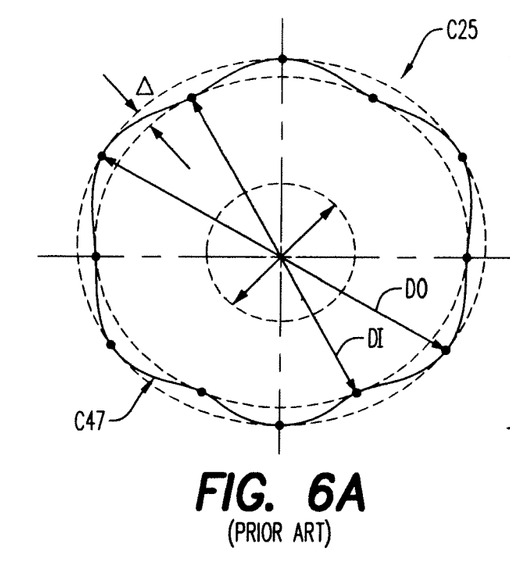
FIGS. 6A-6C are top, first side, and second side views of a cutting insert according to an embodiment of the present invention.
Figure 6B:
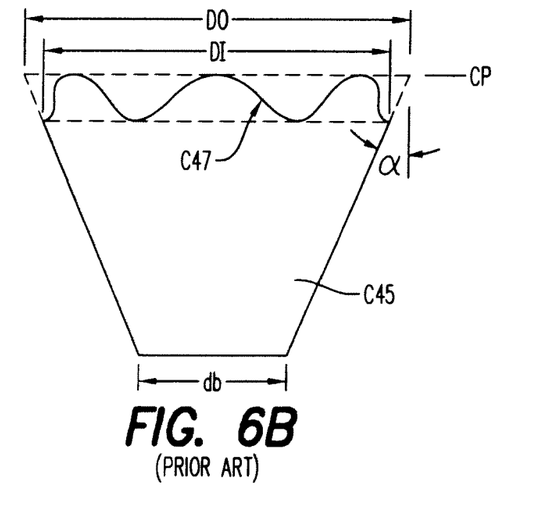
Figure 6C:
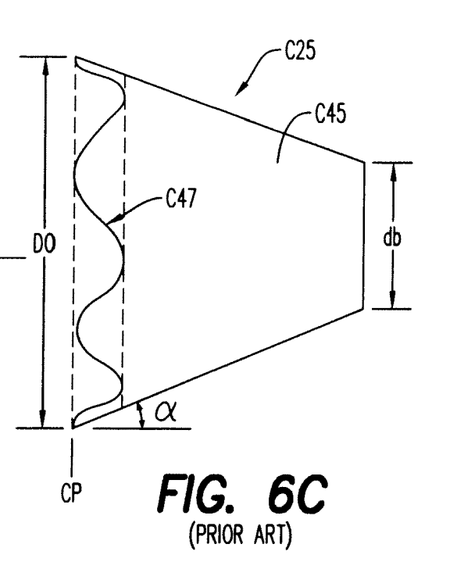
Figures 7A, 7B:
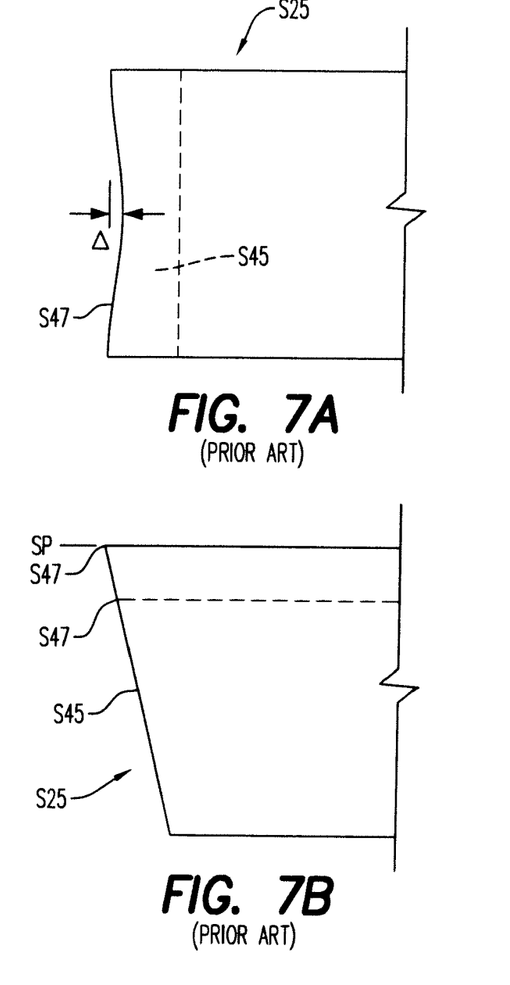
FIGS. 7A-7C are top, first side, and second side views of a cutting insert according to an embodiment of the present invention.
Figure 7C:
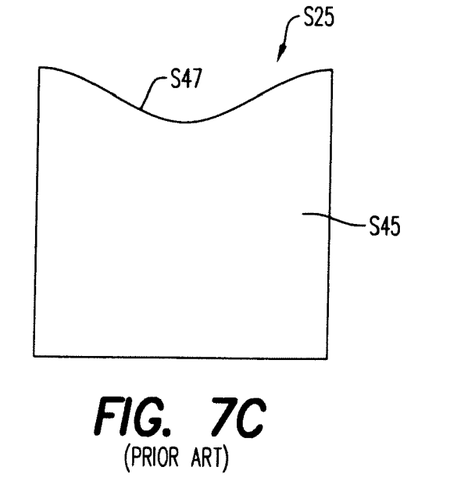

As seen in FIG. 5, which shows six side insert supporting surface 531 below the bottom edge 553 of the adjusted clearance surface 545, the side insert supporting surfaces can at least partially project from the adjusted clearance surface. This is true, as well, if the side insert supporting surfaces are entirely or partially in the adjusted clearance surface. As shown in phantom in FIG. 4, the side insert supporting surface 431 can be partially recessed with respect to the adjusted clearance surface 445 having a bottom edge 453' and can also partially project from the adjusted clearance surface.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The disclosures in Swedish patent application No. 0600338-8, from which this application claims priority are incorporated herein by reference.

While this invention has been illustrated and described in accordance with a preferred embodiment, it is recognized that variations and changes may be made therein without departing from the invention as set forth in the claims.

The invention claimed is:

1. A cutting insert, comprising a clearance surface and a cutting edge, wherein a shape of the clearance surface is defined relative to an imaginary surface that is substantially frustoconical, the imaginary surface forming a non-zero angle with a perpendicular to a plane of a top surface of the insert, wherein the clearance surface differs from the imaginary surface and forms the non-zero angle with the perpendicular to the plane of the top surface, and wherein a shape of the cutting edge is defined relative to a first imaginary edge disposed above the imaginary surface, all points on the first imaginary edge being disposed at the plane of the top surface, the cutting edge being disposed above the clearance surface, at least some but fewer than all points on the cutting edge being disposed at different distances from the plane of the top surface, a profile of the cutting edge viewed in the direction of the perpendicular to the plane of the top surface corresponding to a profile of the first imaginary edge.

2. The cutting insert as set forth in claim 1, wherein the clearance surface extends around an entire periphery of the insert.

3. The cutting insert as set forth in claim 2, wherein the profile of the cutting edge viewed in the direction of the perpendicular to the plane of the top surface defines a substantially elliptical shape.

4. The cutting insert as set forth in claim 1, wherein the clearance surface extends at least partially around a periphery of the insert.

5. The cutting insert as set forth in claim 1, wherein the clearance surface extends to a bottom surface of the insert.

6. The cutting insert as set forth in claim 1, wherein the clearance surface is disposed axially above a bottom surface of the insert.

7. The cutting insert as set forth in claim 1, wherein it comprises a second imaginary edge above the imaginary surface, all points on the cutting edge having corresponding points on the second imaginary edge and being disposed at equal distances from the plane of the top surface such that a profile of the second imaginary edge viewed in a direction of the perpendicular to the plane of the top surface is different than a profile of the first imaginary edge, and wherein a profile of a planar cross-section of the clearance surface, the cross-section being taken parallel to the plane of the top surface, viewed in the direction of the perpendicular to the plane of the top surface inversely corresponds to a profile of the second imaginary edge.

8. The cutting insert as set forth in claim 1, wherein the profile of the cutting edge viewed in the direction of the perpendicular to the plane of the top surface at least partially defines a substantially elliptical shape.

9. The cutting insert as set forth in claim 8, wherein the profile of the cutting edge viewed in the direction of the perpendicular to the plane of the top surface at least partially defines a substantially circular shape.

10. The cutting insert as set forth in claim 1, wherein the profile of the cutting edge viewed in the direction of the perpendicular to the plane of the top surface is substantially aligned with the profile of the first imaginary edge.

11. The cutting insert as set forth in claim 1, wherein the insert is at least one of a milling, turning, boring, parting, grooving, threading, and drilling insert.

12. A cutting tool, comprising a toolholder comprising a recess for receiving an insert and at least one abutment surface for abutting at least one side insert supporting surface on the insert, wherein the cutting tool comprises a cutting insert comprising a clearance surface and a cutting edge, the clearance surface being defined relative to an imaginary surface that is substantially frustoconical, the imaginary surface forming a non-zero angle with a perpendicular to a plane of a top surface of the insert, the clearance surface differing from the imaginary surface and forming the non-zero angle with the perpendicular to the plane of the top surface, and the cutting edge being disposed above the clearance surface and being defined relative to a first imaginary edge disposed above the imaginary surface, all points on the first imaginary edge being disposed at the plane of the top surface, at least some but fewer than all points on the cutting edge being disposed at different distances from the plane of the top surface, a profile of the cutting edge viewed in the direction of the perpendicular to the plane of the top surface corresponding to a profile of the first imaginary edge.

13. The cutting tool as set forth in claim 12, wherein the side insert supporting surface is at least partially recessed with respect to the clearance surface.

14. The cutting tool as set forth in claim 13, wherein the side insert supporting surface at least partially projects from the clearance surface.

15. The cutting tool as set forth in claim 14, wherein the side insert supporting surface is at least partially recessed with respect to the clearance surface.

* * * * *